March 21, 1967 S. T. CARTER 3,310,030
APPARATUS FOR APPLYING GUM TO A LABEL PICKER
Original Filed May 20, 1963 7 Sheets-Sheet 1

INVENTOR.
SIDNEY T. CARTER
BY
ATT'YS

March 21, 1967 S. T. CARTER 3,310,030
APPARATUS FOR APPLYING GUM TO A LABEL PICKER
Original Filed May 20, 1963 7 Sheets-Sheet 2

INVENTOR.
SIDNEY T. CARTER
BY
ATT'YS

March 21, 1967  S. T. CARTER  3,310,030
APPARATUS FOR APPLYING GUM TO A LABEL PICKER
Original Filed May 20, 1963  7 Sheets-Sheet 3

INVENTOR.
SIDNEY T. CARTER
BY
ATT'YS

INVENTOR.
SIDNEY T. CARTER
ATT'YS

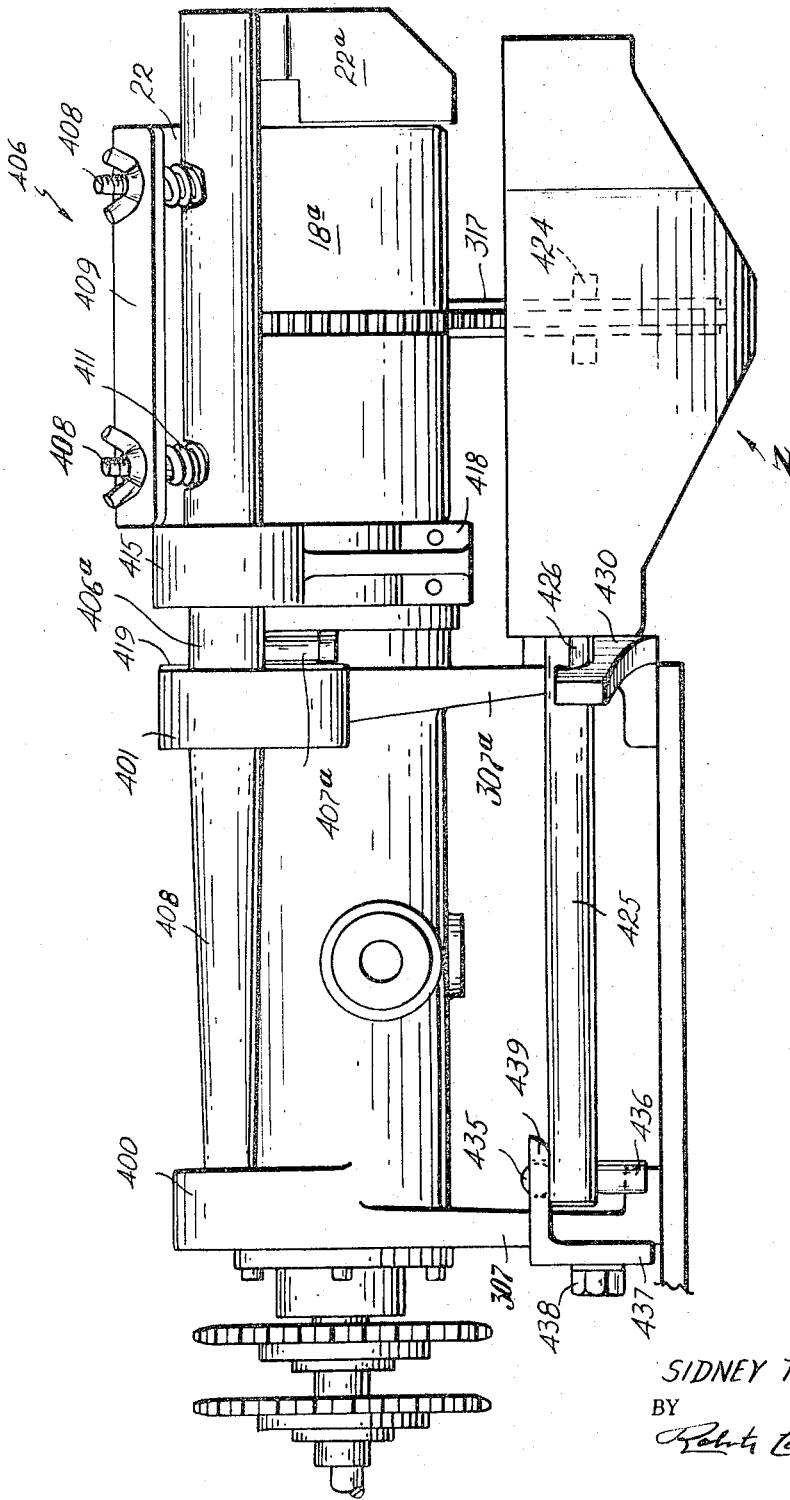

March 21, 1967 S. T. CARTER 3,310,030
APPARATUS FOR APPLYING GUM TO A LABEL PICKER
Original Filed May 20, 1963 7 Sheets-Sheet 7
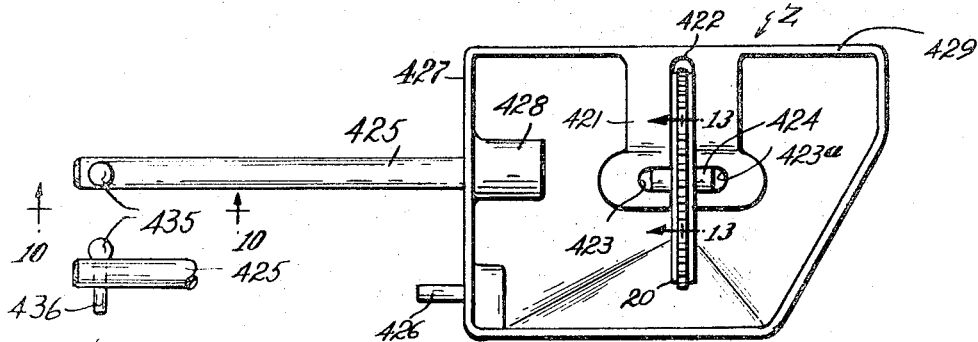
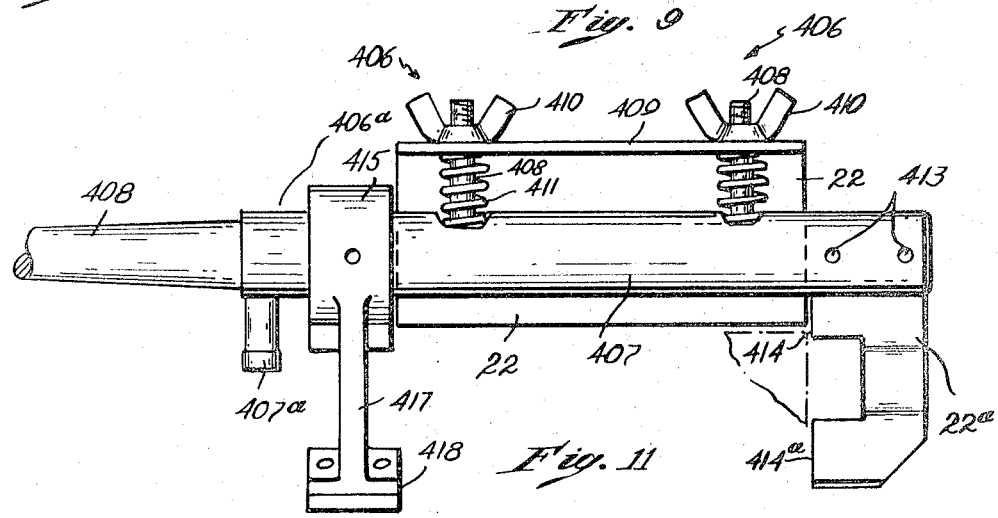
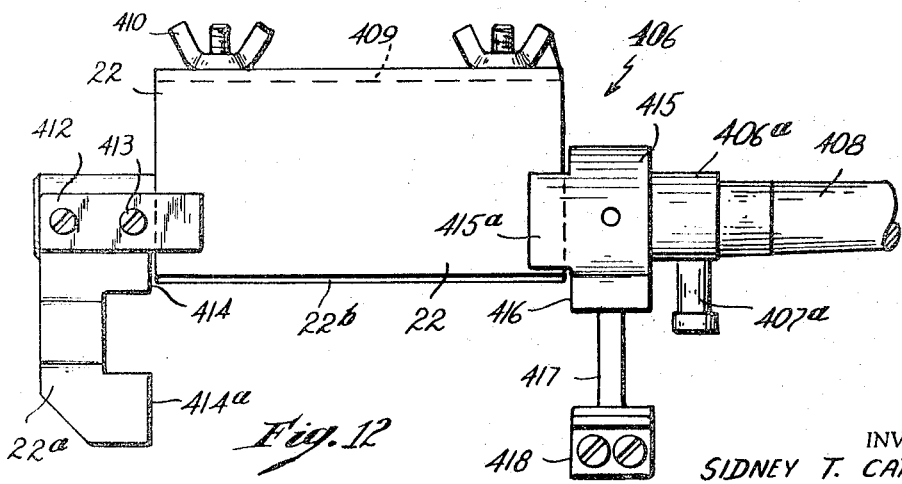
INVENTOR.
SIDNEY T. CARTER
BY
ATT'YS

United States Patent Office 3,310,030
Patented Mar. 21, 1967

3,310,030
APPARATUS FOR APPLYING GUM TO A
LABEL PICKER
Sidney T. Carter, Shrewsbury, Mass., assignor to Geo. J.
Meyer Manufacturing Co., Cudahy, Wis., a corporation
of Wisconsin
Original application May 20, 1963, Ser. No. 281,624, now
Patent No. 3,262,422, dated July 26, 1966. Divided
and this application Oct. 20, 1965, Ser. No. 498,409
13 Claims. (Cl. 118—261)

This invention pertains to label-applying apparatus and more especially to an improved gum receptacle and devices whereby gum is taken from the receptacle and presented in readiness for transfer to a picker, the present application being a division of copending application for Letters Patent, Ser. No. 281,624, filed May 20, 1963 now Patent No. 3,262,422, issued July 26, 1966 by Sidney T. Carter for Apparatus for Applying Gum to a Label Picker.

An object of the invention is to provide a gum-supply roll of approved type and for transferring gum from a gum box or reservoir to the supply roll; a further object being to provide a transfer roll and supply roll with which the transfer roll cooperates wherein provision is made for so relatively adjusting the rolls as to insure the application of a coating of uniform thickness to the transfer roll. A further object is to provide a gum box and means for spreading gum uniformly over the peripheral surface of a gum-presenting or supply roll which may readily be removed from the machine for cleaning without requiring the use of tools or the removal or loosening of retaining elements.

Other and further objects and advantages of the invention will be pointed out in the following more detailed description and by reference to the accompanying drawings wherein:

FIG. 1 is a fragmentary, perspective view (omitting the label magazine and certain other parts), showing the gum-applying apparatus of the present invention as embodied in a rotary or turret-type labeling machine, the two gum-applying or transfer rolls being shown at a time at which they are both closely adjacent to but spaced from the gum-supply or presenting roll, while the picker, having taken a label (not shown) from the magazine, is on its way to the transfer position;

FIG. 2 is a fragmentary front elevation, partly in perspective, of the apparatus shown in FIG. 1, showing the parts at a different point in the cycle, one of the gum-applying or transfer rolls being in contact with the gum-supply roll, while the other roll, having received gum, has moved toward the position at which it will soon be contacted by the picker to apply gum to the latter, the picker now being at the transfer position;

FIG. 8 is a rear elevation of the gum-presenting roll, the gum box and gum-elevating roll; and the scraper assembly for the presenting roll;

FIG. 9 is a plan view of the gum box removed from the machine;

FIG. 10 is a partial view on the line 10—10 of FIG. 9;

FIG. 11 is a rear elevation of the gum-spreading device removed from the machine;

FIG. 12 is a fragmentary front elevation of the spreading device removed from the machine; and FIG. 13 is a fragmentary face-view of the gum-elevating roll.

The apparatus of the present invention includes a gum box Z (FIG. 2) for holding liquid gum, having therein a gum-elevating roll 20 which picks up gum from the box and applies it to the peripheral surface of a constantly rotating gum-supply or presenting roll 18a (FIGS. 1, 2, 4 and 5). From the roll 18a gum is taken by two independent rotary transfer rolls $R^1$ and $R^2$ (FIGS. 1, 2 and 3), one of which receives gum from the roll 18a and applies it to the picker during one picker cycle, while the other transfer roll takes gum from the supply or presenting roll 18a and applies it to the picker during the following cycle, the means for actuating the picker and the two transfer rolls being so devised that one transfer roll may be receiving gum from the elevating roll, while the other transfer roll is applying gum to the picker, and vice versa.

While of broader utility, the label-picking and gum-applying mechanism of the present invention is here illustrated and described with particular reference to its application to a labeling machine of the rotary type.

Figure 2:
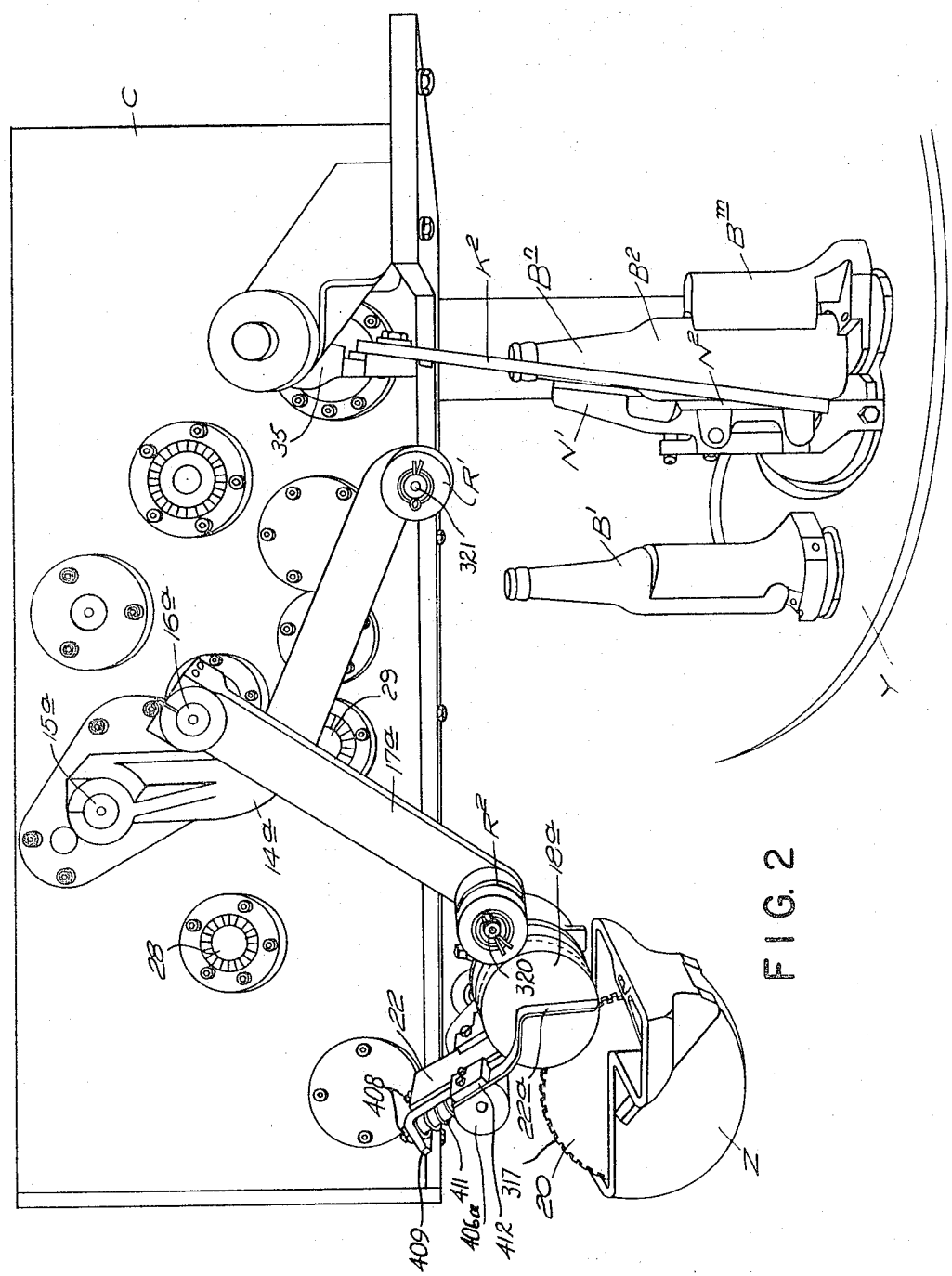
Figure 3:
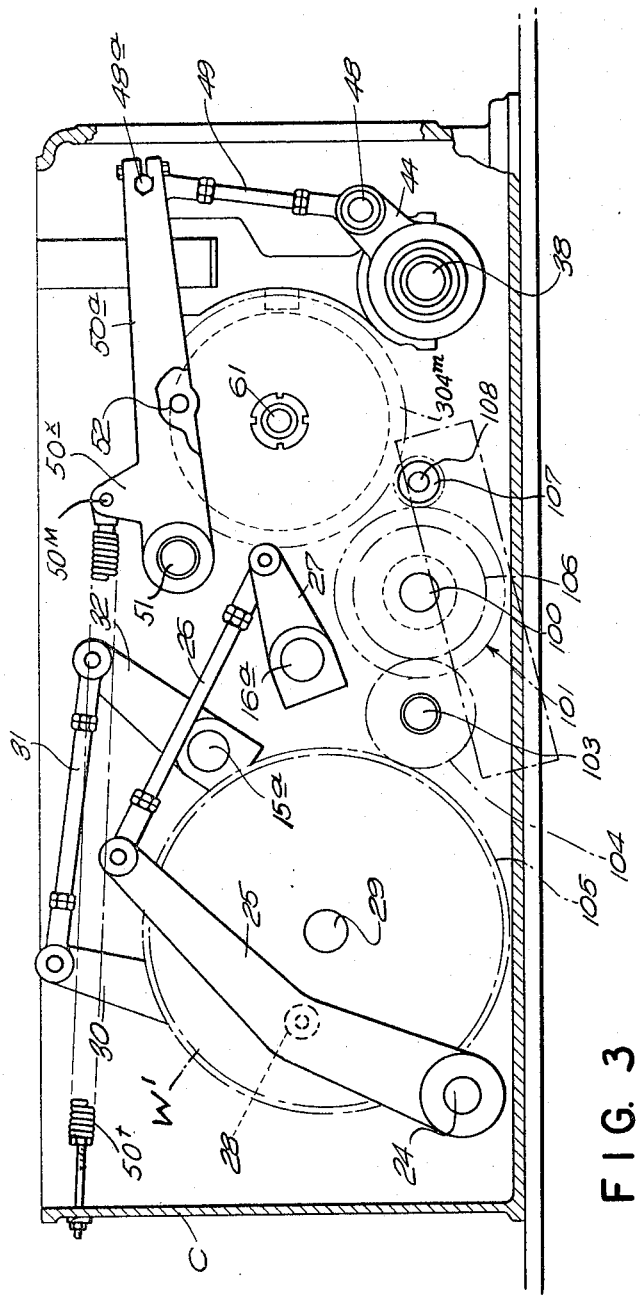
FIG. 3 is a vertical, longitudinal section through the casing or housing for the gears and cams which actuate the gum-transfer rolls and picker, with some parts broken away, and showing the several shafts in end elevation and diagrammatically indicating the locations of some of the cams.

Referring to FIG. 3, there is diagrammatically shown, in side elevation, a casing or housing C for the gears and actuating cams for the gum-transfer rolls and picker. This casing supports bearings for the several shafts involved in driving the operative parts. Thus, the gum-transfer rolls $R^1$ and $R^2$ are here shown (FIG. 2) as carried, respectively, by a long lever arm 14a and a relatively shorter lever arm 17a, these arms being fixed to rock shafts 15a and 16a respectively. The gum-supply or presenting roll is diagrammatically indicated at 18a; and the position of the label magazine is indicated by broken lines at M; and one end of the picker shaft appears (FIG. 3) at 38. The centers of certain other shafts, hereafter to be referred to, are indicated at $C^1$, $C^2$, $C^3$, $C^4$, $C^5$ and $C^6$, respectively.

Figure 1:
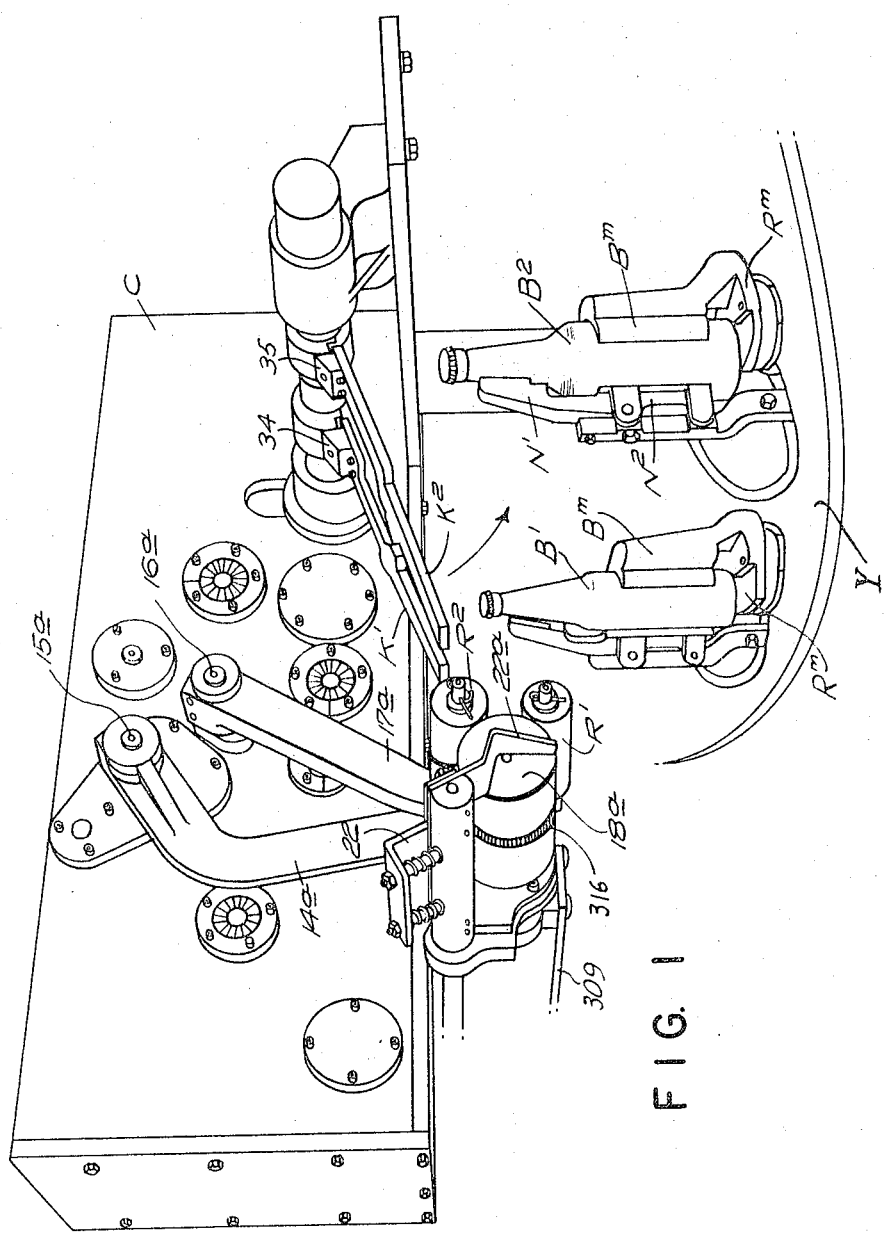

In FIG. 1 the casing or housing C is shown, merely by way of example, as associated with a labeling machine of the rotary or turret type above referred to, comprising the horizontal table Y which is turned by mechanism (not here illustrated), and upon which is mounted a series of bottle carriers $Rm$, each having a bottle-steadying bracket $Bm$ which holds the bottle in upright position and prevents it from tipping in response to the pressure of the label pressing pad. Associated with each holder there is a grip-finger device comprising, as here shown, upper and lower parts $N^1$ and $N^2$ designed, respectively, to press the neck and body labels, delivered by the picker, against the bottle.

The picker is of the separable blade type comprising the blades K1 and K2 which, when separated, hold the label by its ends so that the label extends transversely of the bottle path and is thus contacted by the moving bottle.

As illustrated in FIGS. 1 and 2, the gum is delivered to the gum-supply or presenting roll 18a from an open-topped reservoir or gum box Z (FIG. 2), having therein a rotating gum elevating roll 20, here shown as a disc having peripheral teeth 317. A doctor blade or scraper 22 (FIGS. 1, 2 and 6) is urged toward the roll 18a under spring pressure and operates to spread the gum longitudinally of the roll 18a. Associated with this doctor blade 22 there are scraper blades 22a. (FIGS.

1, 2 and 11) which remove gum from the ends of the roll 18a and return it to the gum box.

Figure 4:
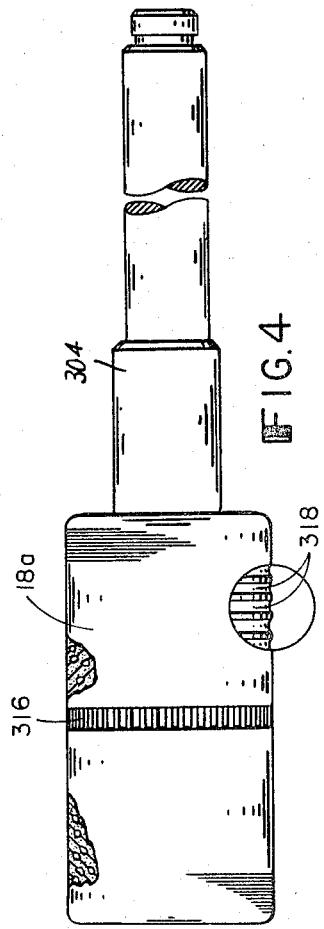
FIG. 4 is a fragmentary elevation (but with a portion shown magnified), illustrating the gum-presenting or supply roll with its shaft.

Referring to FIGS. 4 and 12, the presenting roll 18a, which is desirably, although not necessarily, of porcelain or other ceramic material and which, for example, may be of the order of 3 inches in diameter and of a length of approximately 6 inches, is substantially cylindrical and fixed to one end of a rigid shaft 304 (FIG. 5) which turns in bearings in a frame 300a comprising the spaced vertical supporting flanges 307 and 307a. These flanges have horizontal feet at their lower edges, respectively, which rest upon a supporting plate 309 on which they may slide, being normally held in fixed position by bolts 310 passing up through slots in plate 309. By means of adjusting screws 308 and 308a (FIGS. 6 and 7), the flanges 307 and 307a may be adjusted (after loosening bolts 310) in a direction perpendicular to the vertical plane of the axis of the shaft 304 thereby to adjust the roll 18a bodily in a horizontal plane.

The supporting plate 309 rests upon vertically adjustable screws 311 and 312 (FIG. 5) having threaded engagement with brackets 313 and 314 carried by a fixed part 315 of the machine frame. By this means the axis of the roll 18a may be adjusted vertically.

As shown in FIG. 4, the cylindrical roll 18a has a peripheral groove approximately midway between its opposite ends and within this groove there are arranged gear teeth 316 of suitable shape for driving engagement with the teeth 317 (FIGS. 2 and 13) formed on the edge of the gum-elevating or supply roll 20.

Figure 5:
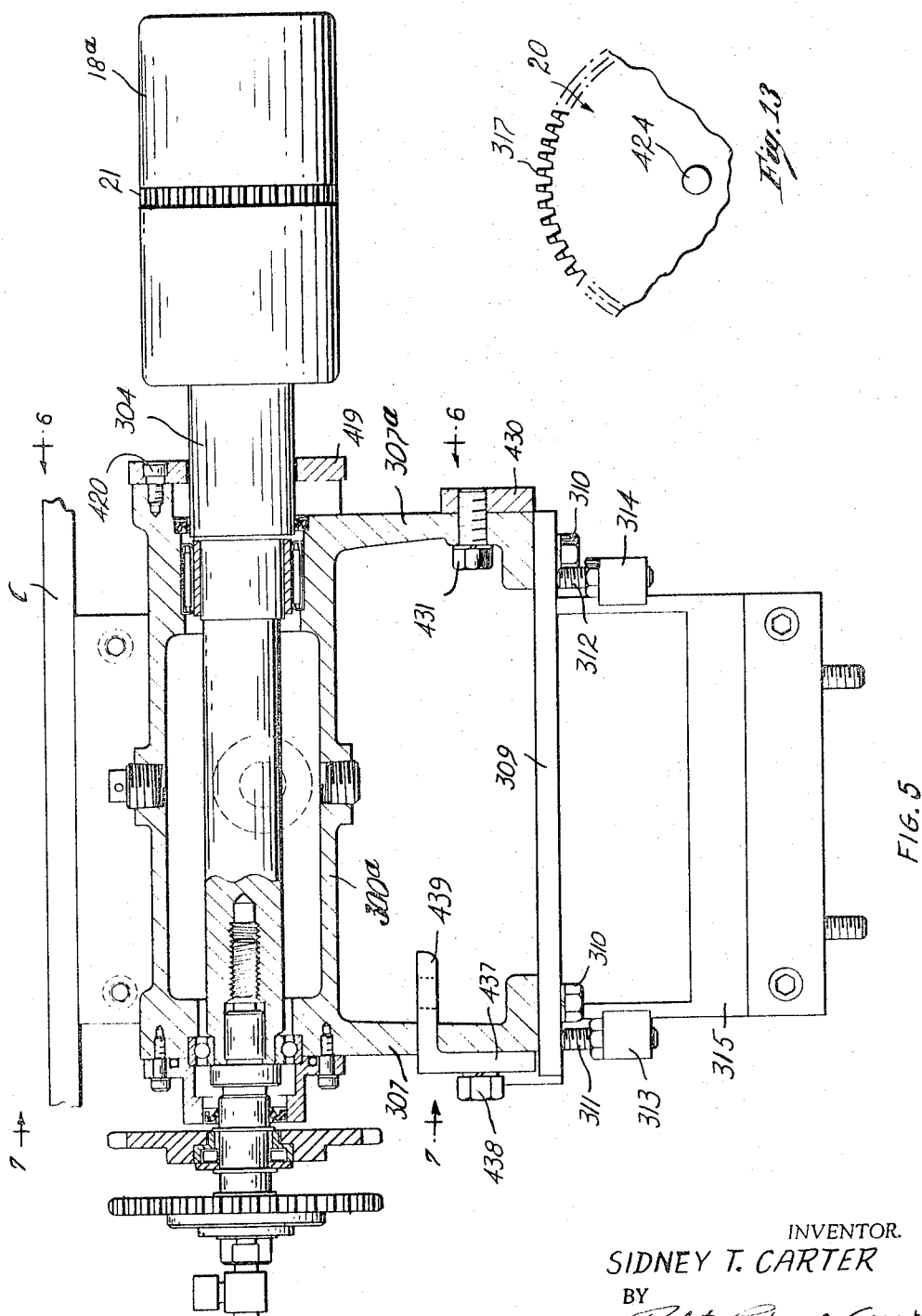
FIG. 5 is a fragmentary section in the vertical plane of the axis of the gum-presenting roll, illustrating an attachment which comprises the gum-presenting roll and its supporting and driving shaft.

Referring to FIG. 5, the shaft 304, which carries the roll 18a at one end, is provided at its opposite end with a pair of sprocket wheels, each connected to its shaft by an overrunning clutch of conventional type (not here shown). One sprocket is constantly driven by a chain (not here shown), while the other sprocket is driven through suitable connections (not shown) from the main shaft 108 (FIG. 3) which actuates the picker and transfer rolls. Thus, the rolls 20 and 18a turn continuously even though the transfer rolls and pickers are not operating. This insures a constant agitation of the gums in the gum box such as to prevent it from crusting over.

Referring to FIGS. 2 and 5 to 13 inclusive, the frame 300a (FIG. 5), which carries the bearings for the shaft 304 to which the gum-presenting roll 18a is fixed, is provided at opposite ends with integral lugs 400 and 401 (FIGS. 6, 7 and 8) which have aligned openings within which there are fixed bushings (not shown), a bushing 402 in the lug 400 being of smaller maximum diameter than the bushing 403 in the lug 401. The gum-spreading assembly 406 (FIG. 8), which includes the doctor blade 22 and scraper members 22a and 418 comprises a shaft 406a (FIG. 11) having a cylindrical portion 407 (FIG. 11) and a tapering portion 408 (FIGS. 11 and 12). A friction fit is thus provided. To prevent undesired motion of this shaft, when the device is in use, it is provided with a radially extending pin 407a (FIGS. 8, 11 and 12), which, when the scraper assembly is in operative position is disposed between laterally spaced abutment surfaces (FIG. 8) and thereby prevents axial motion of this shaft and which contacts a part of the machine frame thus limiting rotation of the shaft. However, by manually turning the shaft until the part 407a is moved from between said abutment surfaces, the shaft 406a may be withdrawn endwise from the bushing without necessitating the removal or loosening of set screws or other customary retaining devices. The gum-spreading assembly may thus be very readily removed from the machine, for example, for cleaning or adjustment of its parts.

Two pins 408 (FIGS. 2 and 11), spaced longitudinally of the cylindrical part 407 of the shaft 406a, project radially from the latter and pass through holes in a flange 409 integral with the doctor blade 22. The outer portions of these pins 408 are screw-threaded for the reception of wing nuts 410. Compression springs 411 are interposed between the flange 409 and the peripheral surface of the part 407. By turning the wing nuts 410, the lower edge 22b (FIG. 12) of the doctor or scraper blade 22 may be adjusted relatively to the peripheral surface of the gum-presenting roll 18a.

The scraper 22a (FIG. 1) which removes gum from the outer end of the roll 18a, has its upper part (FIG. 12) clamped between a plate 412 and the periphery of the shaft 406a by bolts 413. This end scraper blade 22a has an upper portion provided with a vertical edge 414 which is closely adjacent to the upper part of the outer end face of the roll 18a, when the parts are assembled, and another vertical edge portion 414a which is closely adjacent to the lower part of the outer end face of the roll 18a.

Figure 6:
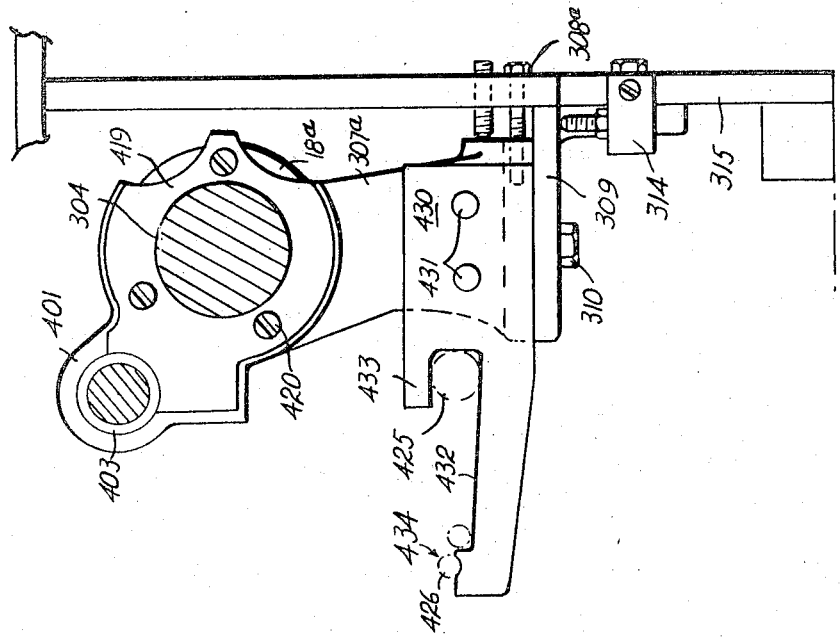
FIG. 6 is a fragmentary, vertical section on the line 6—6 of FIG. 5.

Adjacent to the inner end of the blade 22, a collar 415 (FIG. 11) is fixed to the shaft 406a, this collar having (FIG. 12) a portion 415a which overlies the front face of the blade 22, and a vertical edge 416 which is closely adjacent to the upper part of the inner end face of the roll 18a. An arm 417 (FIGS. 11 and 12), extends downwardly from the collar 415 and has a scraper member 418 at its lower edge which engages the periphery of the shaft 304 on which the roll 18a is mounted, this scraper edge extending from the end face of the roll to the exposed radial surface of an annulus 419 (FIG. 6), desirably of an anti-friction material such as a hard synthetic plastic, which is secured to the frame 307a by screws 420 (FIG. 6).

The gum box Z (FIGS. 1 and 9) may be of any suitable material appropriate to hold the liquid gum which is employed, although desirably of some material which is not corroded by the gum. For example, and as here illustrated, it is a unitary aluminum casting having an internal, integral support 421 (FIG. 9) provided with an elongate slot 422 for the reception of the gum-elevating roll 20. At opposite sides of this slot the support 421 is provided with open bearings 423 and 423a aligned with each other and which are designed to receive trunnion or journal elements 424 coaxial with the roll 20 and projecting from opposite sides of the latter. These trunnions provide for free rotation of the roll 20, but, at the same time, permit the roll to be lifted freely from the gum box without necessitating the manipulation of bolts, set screws, or other retaining devices. This gum-elevating roll 20 is here shown (FIGS. 2, 9 and 13) as a disc which may, for example, be of the order of one-half inch in thickness and of a diameter of five inches (such dimensions being cited merely by way of example and without limiting intent), and the edge of this disc-like roll is provided with teeth 317 (FIG. 13), as above described, for engagement with the teeth 21 of the gum-presenting roll 18a. While the gum-elevating roll 20 may be of any suitable or desirable material, it has been found that a roll made from layers of textile fabric bonded together by means of a suitable synthetic plastic under high pressure is desirable for the intended purpose, since it is not subject to corrosion by the gum and makes good running contact with the teeth 21.

For supporting the gum box in position, it is provided with two rigid rods 425 and 426 projecting from its left-hand wall 427, as viewed in FIGS. 8 and 9, the box desirably having an integral, internal boss 428 having a bore for the reception of the inner end of the rod 425, said end being permanently fixed within the bore. This rod 425 is coaxial with the trunnions 424 and provides the principal support for the gum box, rod 425 functioning primarily to prevent the box from rocking accidentally about the axis of the rod 425. The rod 425, as here shown, is of a length approximating the maximum dimension of the gum box, that is to say, the length of the wall 429 (FIG. 9) of the latter. Referring to FIG. 6 there is shown a cradle 430 which is fixed to the flange 307a of the frame 300a by means of bolts 431, this cradle having an elongate supporting surface 432, preferably, as shown, sloping downwardly at a slight angle toward its forward end and upon which the rod 425 rests when the parts are assembled. The cradle also comprises a part 433 overhanging the forward end of the surface 432, forming with the surface 432 a socket within which that portion of the rod 425 (indicated in broken lines in FIG. 6), which is adjacent to the wall 427 of the gum box, is normally disposed. The cradle 430 is provided at its outer or rear end with a cavity 434 for the reception of the rod 426 when the gum box is in operative position.

Figure 7:
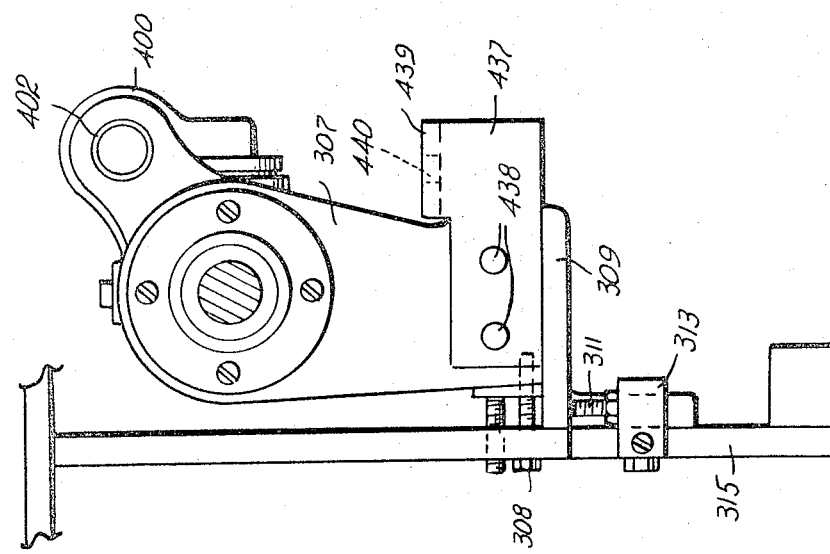
FIG. 7 is a fragmentary, vertical section on the line 7—7 of FIG. 5.

Near its outer or free end the rod 425 is provided with a retaining device 435 (here shown, FIG. 10, as a ball at the upper end of a pin 436 fixed in a diametrical opening in the shaft 425). As shown in FIGS. 5 and 7, the frame 300a is provided, at the opposite side from the cradle 430, with a bracket 437 attached to the frame by bolts 438 and having a horizontal flange 439 provided with a socket opening 440 (FIG. 5) of a size to receive the ball 435.

When the parts are assembled, that portion of the rod which is close to the wall 427 of the gum box, is within the socket beneath the part 433 of the cradle 430 and resting upon the surface 432, while the free end of the rod 425 is disposed below the flange 439 of the bracket 437, with the ball 435 in the socket 440 and with the major part of the weight of the gum box assembly to the right of the flange 397a. The gum box is thus held firmly in place and with the teeth of the gum-elevating roll 20 engaging the teeth 21 of the roll 18a. However, if it be desired to remove the gum box for washing, it is merely necessary to rock the rear edge of the gum box upwardly about the axis of the rod 425 and, in so doing, disengage the teeth of roll 20 from the teeth of roll 18a. The gum box may now be moved rearwardly about the ball 435 (FIG. 8) as a pivot while the rod 425 slides along the surface 432 of the cradle until the box is free of adjacent parts and then the free end of the rod 425 may be moved downwardly to disengage the ball 435 from the socket, leaving the gum box entirely free without necessitating the preliminary loosening or removal of parts.

It will thus be appreciated that the means for supplying gum to the presenting roll 18a is of such design and construction that it is very easy to clean its parts, including the scraper devices, the gum box and the gum-elevating roll, without requiring the employment of tools as a preliminary.

While one desirable embodiment of the invention has herein been disclosed by way of example, it is to be understood that the invention is broadly inclusive of any and all modifications falling within the terms of the appended claims.

I claim:

1. A labeling machine of the kind wherein liquid gum is taken from a supply and applied to a label picker and wherein the gum is held in an open-topped receptacle or gum box having therein a rotatable gum-elevating roll so arranged as to be partially immersed in the liquid gum, a smoothly cylindrical gum-supply roll whose axis is parallel to that of the elevating roll and whose peripheral surface is above the level of the gum in the receptacle and which is so arranged as to receive gum from the elevating roll, means for rotating the gum-supply roll at a predetermined angular velocity, characterized in that the supply roll has a peripheral groove approximately midway between its ends with gear teeth disposed in said groove, the tips of the teeth being substantially flush with the periphery of the roll, and the gum-elevating roll has a peripheral row of teeth which mesh with the teeth of the supply roll, whereby the motion of the supply roll is transmitted to the elevating roll, further characterized in having a doctor blade, having a rectilinear edge extending from end-to-end of the supply roll and which is parallel to the axis of the roll, and means for adjusting said edge toward or from the periphery of the roll thereby to provide the surface of the supply roll with a layer of gum of predetermined uniform thickness.

2. In a labeling machine of the kind wherein liquid gum is taken from a supply and applied to a label picker and wherein the gum is held in an open-topped receptacle or gum box having therein a rotatable gum-elevating roll so arranged as to be partially immersed in the liquid gum, in combination, a gum-supply roll whose axis is parallel to that of the elevating roll and whose peripheral surface is above the level of the gum in the receptacle and which is so arranged as to receive gum from the elevating roll, means for rotating the gum-supply roll at a predetermined angular velocity, and means whereby motion of the supply roll is transmitted to the elevating roll, and wherein the supply roll has teeth, for driving the elevating roll, disposed in a circumferential groove, and wherein a rotatable transfer roll takes gum from the supply roll and applies it to the picker, further characterized in that the transfer roll has a peripheral groove which registers with the teeth of the supply roll thereby to avoid the delivery of surplus gum to the transfer roll by said teeth.

3. A labeling machine of the kind wherein gum from a supply roll is applied to a label picker by a transfer roll and wherein the supply roll is cylindrical and is coaxial with and fixed to one end of a constantly driven shaft, and means for shifting said shaft both vertically and horizontally, whereby the supply roll may be adjusted so as to make an uninterrupted line contact with the peripheral surface of the transfer roll throughout the entire length of the latter, characterized in that the means whereby said shaft may be shifted both vertically and horizontally comprises bearings carried by a frame having spaced, vertical supporting elements provided with horizontal feet at their lower edges, respectively, which rest upon a normally horizontal supporting plate on which they may slide and to which they are normally secured by bolts passing through slots in the plate, and means whereby said vertical supporting elements may be adjusted, after loosening the bolts, in a direction perpendicular to the vertical plane of the axis of the shaft, thereby to adjust the roll bodily in a horizontal plane, the supporting plate resting upon vertically adjustable screws having threaded engagement with parts of the machine frame whereby the plate, and therewith the axis of the roll, may be adjusted vertically.

4. In a labeling machine of the kind wherein gum from a supply roll is applied to a label picker by a rotary transfer roll and wherein the transfer roll is mounted to turn on a crankpin fixed at one end to a power-actuated crankarm, characterized in that the transfer roll tapers in diameter, the smaller end of the roll being adjacent to the rock arm, the taper of the roll being such as to compensate for spring of the crankpin and crankarm when the roll contacts the picker and wherein gum is delivered to the supply roll by a gum-elevating roll partially immersed in a body of liquid gum, and wherein the supply roll has peripheral teeth for engagement with teeth on the elevating roll, the teeth on the supply roll being sunk in a peripheral groove in the latter so that their tips are substantially flush with the peripheral surface of the supply roll, characterized in that the supply roll is of ceramic material and of unitary construction.

5. A labeling machine of the kind wherein liquid gum is taken from a supply and applied to a label picker and wherein the gum is held in an open-topped receptacle or gum box having therein a rotatable disc-like gum-elevating roll so arranged as to be partially immersed in the liquid gum, and wherein the gum-elevating roll is provided with peripheral teeth, a constantly rotating gum-supply roll which supplies gum to a transfer roll, the supply roll having gear teeth midway between its ends which mesh with the teeth of the elevating roll, means for rotating the supply roll at a predetermined angular velocity whereby the teeth of the elevating roll pick up gum and deliver it to the midportion, only, of the supply roll, and means operative to spread gum, delivered to the midportion of the supply roll, uniformly over the peripheral surface of the supply roll, characterized in having means so supporting the gum box that the teeth of the elevating and supply rolls may be disengaged by tilting the gum box about the axis of the elevating roll preparatory to removing the gum box from operative position.

6. In a labeling machine of the kind wherein liquid gum is taken from a supply and applied to a label picker and wherein the gum is held in an open-topped receptacle or gum box having therein a rotatable gum-elevating roll so arranged as to be partially immersed in the liquid gum, in combination, a gum-supply roll whose axis is parallel to that of the elevating roll and whose peripheral surface is above the level of the gum in the receptacle and to whose midportion gum is applied by the elevating roll, means for rotating the gum-supply roll at a predetermined angular velocity, and means whereby motion of the supply roll is transmitted to the elevating roll, further characterized in that the gum-elevating roll is a disc, said elevating roll having oppositely directed, coaxial trunnions, means within the box providing open bearings in which the trunnions of the gum-elevating roll are normally seated and in which they are free to turn, and wherein the gum-elevating roll is provided with peripheral teeth designed to mesh with complemental teeth of a rotating driving element, and wherein the driving element is the aforesaid gum-supply roll which supplies gum to a transfer roll, the supply roll having gear teeth midway between its ends which mesh with the teeth of the elevating roll, and means operative to spread gum, delivered by the elevating roll, to the midportion of the supply roll, uniformly over the peripheral surface of the supply roll, and means for supporting the gum box comprising horizontally spaced, elongate, rigid rods projecting from one end of the box, a fixed cradle having a supporting surface which, when the parts are assembled, is close to said end of the box and upon which said rods rest, the free end of one of said rods normally underlying a fixed part of the machine frame thereby preventing the box from tipping about said supporting surface as a fulcrum but being freely disengageable from said fixed part.

7. A labeling machine of the kind in which a transfer roll supplies liquid gum to a label picker and having a gum box and a gum-elevating roll within the box operative to raise gum above the normal level of the gum in the box, and means operative to turn the gum-elevating roll, the gum box being so supported that, without slackening or removing any part, the box may be removed from its normal operative position while concomitantly disengaging the elevating roll from the means for turning it, characterized in that for supporting the gum box in operative position a rigid rod, coaxial with the axis of the elevating roll, projects from one end of the gum box, an elongate, approximately horizontal rigid supporting element closely adjacent to that end of the box from which the rod projects and upon which the rod normally rests, a fixed part which normally overhangs that portion of the rod which contacts said supporting element and thereby prevents the rod from rising from the supporting element, a second rod, spaced from and parallel to the first rod, which projects from the same side of the box and which normally rests upon said supporting element, and a retaining element at the free end of the first-named rod which normally engages a socket in a fixed part and thereby prevents the box from tipping down about the axis of the first-named rod but which may be withdrawn manually from the socket thereby permitting the first-named rod to be withdrawn from below said overhanging part and so freeing the box to be removed from its support.

8. In a labeling machine of the kind wherein liquid gum is taken from a supply and applied to a label picker and wherein the gum is held in an open-topped receptacle or gum box having therein a rotatable gum-elevating roll so arranged as to be partially immersed in the liquid gum, in combination, a gum-supply roll whose axis is parallel to that of the elevating roll and whose peripheral surface is above the level of the gum in the receptacle and to whose midportion gum is applied by the elevating roll, means for rotating the gum-supply roll at a predetermined angular velocity, and means whereby motion of the supply roll is transmitted to the elevating roll, further characterized in that the gum-elevating roll is a disc, said elevating roll having oppositely directed, coaxial trunnions, means within the box providing open bearings in which the trunnions of the gum-elevating roll are normally seated and in which they are free to turn, and wherein the gum-elevating roll is provided with peripheral teeth designed to mesh with complemental teeth of a rotating driving element, and wherein the driving element is the aforesaid gum-supply roll which supplies gum to a transfer roll, the supply roll having gear teeth midway between its ends which mesh with the teeth of the elevating roll, and means operative to spread gum, delivered by the elevating roll, to the midportion of the supply roll, uniformly over the peripheral surface of the supply roll, and means for supporting the gum box comprising horizontally spaced, elongate, rigid rods projecting from one end of the box, a fixed cradle having a supporting surface which, when the parts are assembled, is close to said end of the box and upon which said rods rest, the free end of one of said rods normally underlying a fixed part of the machine frame thereby preventing the box from tipping about said supporting surface as a fulcrum but being freely disengageable from said fixed part, and the rod, whose end underlies the fixed part of the frame, has attached thereto a peripherally located ball having a free fit in a socket in said fixed frame part, said ball constituting a pivotal axis about which the gum box may be swung rearwardly.

9. A labeling machine of the kind in which a transfer roll applies liquid gum to a label picker and having a gum box and a gum-elevating roll within the box, a gum-supply roll which receives gum from the elevating roll and presents it to the transfer roll, and means for evenly spreading gum over the supply roll, and means so supporting the gum-spreading means that it may be removed from the machine without slackening or removing retaining elements and without disturbing any other part of the machine, characterized in that for supporting the gum-spreading means there is provided a shaft comprising a cylindrical portion and a tapering portion; fixed, spaced parts having axially aligned openings for the reception of said respective portions of the shaft, the tapering portion of the shaft having a friction fit in its respective opening, a pin fixed to the shaft and extending radially therefrom, said pin, when the shaft is in operative position, being located between fixed parts of the machine frame thereby preventing axial motion of the shaft but being disengageable from said fixed parts by partial rotation of the shaft thereby permitting axial motion of the shaft and its removal from said opening.

10. The combination according to claim 9, further characterized in that said shaft is normally stationary and parallel to the axis of the supply roll, and further characterized in that the gum-spreading means comprises a doctor blade mounted on said stationary shaft and having an edge which is parallel to and adjacent to the surface of the supply roll, and scraper means also mounted upon said normally stationary shaft for removing surplus gum from the outer end of the supply roll and from the adjacent portion of the shaft on which the supply roll is mounted.

11. The combination according to claim 10, wherein the doctor blade is connected to its normally stationary supporting shaft by means such as to permit the blade to be adjusted thereby to place its edge in accurate parallelism with and at the appropriate distance from the peripheral surface of the supply roll, and means for so supporting said shaft that it may be turned manually thereby to remove the doctor blade and scraper means from the supply roll to facilitate cleaning the latter.

12. The combination according to claim 10, wherein the shaft on which the doctor blade is mounted has a portion which is normally fitted into spaced, correspondingly stationary bushings from which the shaft may be withdrawn by movement in an axial direction, and means normally retaining said shaft in operative position.

13. The combination according to claim 12, wherein the means for normally retaining said stationary shaft in operative position comprises a rigid part projecting radially from said shaft and which, merely by contact with neighboring elements of the machine, normally limits motion of said shaft.

References Cited by the Examiner
UNITED STATES PATENTS

| | | | |
|---|---|---|---|
| 739,159 | 9/1903 | Ensign | 118—261 X |
| 1,433,215 | 10/1922 | McCamant | 118—243 |
| 1,486,674 | 3/1924 | Meyer | 118—262 X |
| 1,663,232 | 3/1928 | Ambler | 118—261 X |
| 2,316,531 | 4/1943 | Nivling | 118—244 |
| 2,330,430 | 9/1943 | Kantor et al. | 118—243 X |
| 2,331,207 | 10/1943 | Lodge | 118—262 X |

CHARLES A. WILLMUTH, *Primary Examiner.*

L. G. MACHLIN, *Assistant Examiner.*